March 22, 1927.
J. R. BINGAMAN
1,621,653
FLUID BRAKE MECHANISM FOR MOTOR SHAFTS
Filed June 11, 1926
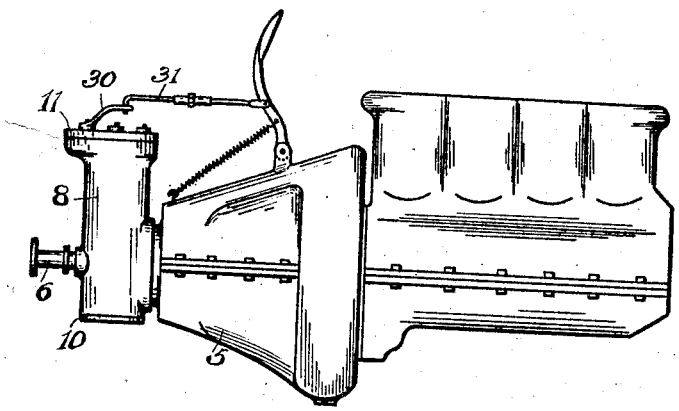
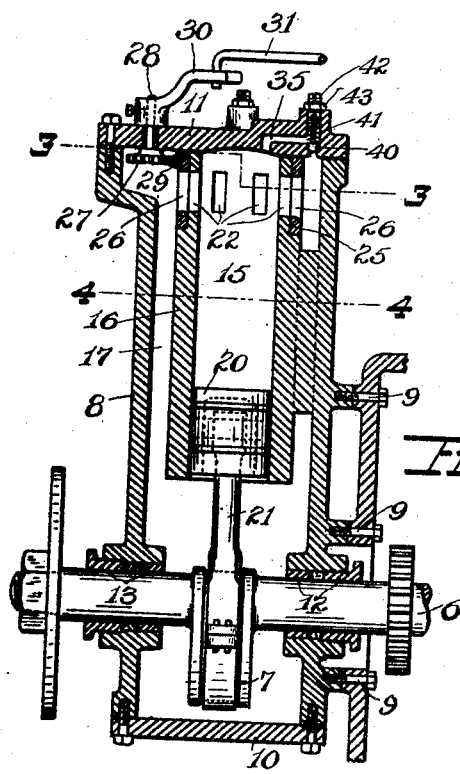
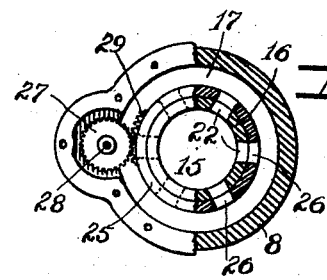
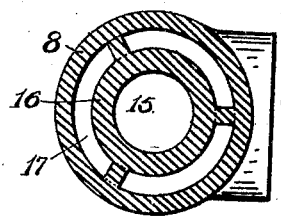
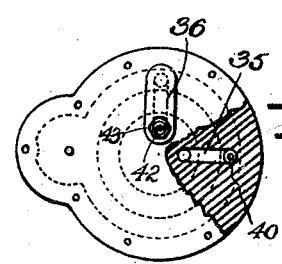
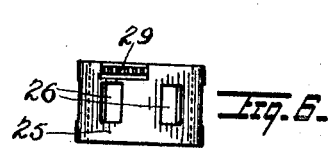
John R. Bingaman INVENTOR,
BY W.G. & D.M. Stewart
ATTORNEYS.

Patented Mar. 22, 1927.

1,621,653

UNITED STATES PATENT OFFICE.

JOHN R. BINGAMAN, OF WEST READING, PENNSYLVANIA.

FLUID BRAKE MECHANISM FOR MOTOR SHAFTS.

Application filed June 11, 1926. Serial No. 115,204.

This invention relates to fluid brake mechanism for power shafts, it being more particularly adapted to braking the transmission shaft of an automobile, and it comprises essentially a shaft-connected piston reciprocatively acting in a liquid-tight housing having restrictable communicating passage-ways to determinedly retard the freedom of movement of said piston and exert a corresponding braking action on its operatively connected shaft; main objects being to provide a simple sturdy structure, utilize the entire reciprocative movement of the piston, accurately regulate the determined restriction of liquid flow, and provide for relief against too sudden or undue restriction, all as will more fully appear in the following specification, reference being had to the accompanying drawings forming part thereof, and the novel features being particularly pointed out in the appended claims.

Fig. 1 is mainly a diagrammatic view showing the transmission gear casing end of a motor and indicating a preferred form and location of the improved fluid brake mechanism hereinafter described.

Fig. 2 is an enlarged longitudinal vertical section of the brake housing and indicating its connection to the gear casing.

Fig. 3 is a cross-sectional view taken mainly on the line 3—3 of Fig. 2.

Fig. 4 is a corresponding cross-sectional view on the line 4—4 of Fig. 2.

Fig. 5 is a fragmentary plan view showing the relief by-passes with their automatically operated central valves.

Fig. 6 is a fragmentary detail view showing the rotatable sleeve for regulating the cylinder port openings.

Referring to the particular construction shown in the drawings, 5 represents the usual transmission gear casing of an automobile motor with the power shaft 6 projecting through the end wall thereof to be connected in known manner through an extension shaft, to the differential drive in the rear axle housing, not shown.

The improved construction now to be described, is adapted to provide a direct braking action, when desired, to this power shaft, and to this end the shaft 6 is preferably provided with an eccentric disc 7 as shown, though an ordinary offset crank portion may instead be employed, and in the claims the term crank is intended to mean either structure.

Surrounding the shaft and enclosing the eccentric disc 7, is a brake housing 8, preferably cylindrical as shown, and extending at right angles from the shaft to provide necessary interior working space; this housing being fixedly secured to the transmission housing by bolts 9, and provided with removably secured end closures or heads, 10 and 11, as shown, with suitably interposed gaskets to make the cylinder liquid tight. Packed bearings 12 and 13 provide liquid-tight apertures for the shaft 6 passing through the walls of this cylinder 8.

Beyond the throw of the disc 7 the cylinder 8 is interiorly formed with a central piston chamber 15, the cylindrical wall 16 thereof being rigidly spaced away from the housing wall to form an annular chamber 17, which chamber, as shown, freely communicates with the open end of piston chamber 15.

A liquid-tight piston 20 fits within the chamber 15 and is reciprocated therein by the eccentric 7, connected thereto by connecting rod 21, and the inner end of said chamber 15 is formed with ports 22 in its wall 16 to provide communication with the chamber 17. When the housing and its interior chambers is filled with a suitable fluid, as glycerine, oil or the like, the action of the piston will merely cause a surge of fluid back and forth through the ports 22, the latter being cumulatively of sufficient size to permit such surge without appreciable pressure on the piston 20, and the latter acting during both its projected and retracted reciprocations in the chamber 15.

To exert a braking action on the shaft 6, it will be readily understood that it is only necessary to cause a determined restriction of such free flow of housing contained fluid, and to this end a cylindrical sleeve 25 is preferably employed, fitted to the wall 16 and provided with ports 26 adapted to register with ports 22 when the sleeve is suitably rotated. And such rotation is simply and positively controlled through a stem 28 mounted in head gear 27 having a stem 28 mounted in head 11 and projecting therethrough; said gear, as shown, meshing with a partial ring gear 29 on said sleeve 25, and a lever 30 fixed to the outer end of said stem 28 and connected in suitable manner, as by rod 31, to a usual foot or hand brake lever. By suitably operating the latter, the sleeve 25 is rotated more or less to partially or fully close the ports 22, restricting the surge of fluid, thus resisting the reciprocations of said piston 20, and consequently braking the turning movement of shaft 6.

To prevent damage to the mechanism from a too hasty closing of the ports 22, or when the braking action causes undue compression strains of the piston 20, by-passes 35 and 36 are formed in the head, as shown, and extending at right angles to one another; one, 35 affording relief to the cylinder 15, and the other 36, to the cylinder 17.

Each by-pass 35 and 36 is provided with a valve 40 normally seated by a spring 41, the tension of which, as shown, may be regulated by a follower bolt 42 and lock nut 43, so as to yieldingly unseat its valve at a fixed fluid pressure; the seated position of said valve closing its respective by-pass and when forced to unseated position permitting a limited flow of fluid therethrough to relieve the strain on piston 20 and its housing 8.

The mechanism thus fully described provides for using both reciprocative movements of the piston 20 so as to constantly maintain control of shaft 6; permits practically free movement of said piston when the ports 22 are opened, and positive nicely determined braking action as said ports are gradually closed by rotating sleeve 25; prevents leaking or breaking strains under too sudden or under braking action through the automatically operative excess-strain by-passes; and is of simple, sturdy structure that may readily adapt it for the severe service requirements of a heavy duty truck engine shaft.

The particular mechanism shown and described may of course be modified within the spirit of the invention as defined in the following claims, and it is also obvious that a gas may in some cases be employed instead of a liquid, as desired.

What I claim is:—

1. A fluid brake mechanism for motors comprising a power shaft, a brake housing enclosing a portion of said shaft and extending at right angles therefrom, a central piston chamber open at one end within said housing, an annular chamber within said housing surrounding said piston chamber and in free communication with the open end of the latter, ports at the closed end of said piston chamber communicating with said annular chamber, a rotatable sleeve covering said ports and having apertures adapted to register with the latter, a fluid medium completely filling said housing and its interior chambers, and means within said housing operative from outside the latter for determinedly rotating said sleeve.

2. A fluid brake mechanism for motors comprising a power shaft, a brake housing enclosing a portion of said shaft and extending at right angles therefrom, a central piston chamber open at one end within said housing, an annular chamber within said housing surrounding said piston chamber and in free communication with the open end of the latter, ports at the closed end of said piston chamber communicating with said annular chamber, a rotatable sleeve covering said ports and having apertures adapted to register with the latter, a fluid medium completely filling said housing and its interior chambers, excessive pressure relief by-passes having tensioned valves controlling flow of fluid into and out of said piston chamber, and means within said housing operative from outside the latter for determinedly rotating said sleeve.

3. A fluid brake mechanism for motors comprising a power shaft, a brake housing enclosing a portion of said shaft and extending at right angles therefrom, a central piston chamber open at one end within said housing, an annular chamber within said housing surrounding said piston chamber and in free communication with the open end of the latter, ports at the closed end of said piston chamber communicating with said annular chamber, a rotatable sleeve covering said ports and having apertures adapted to register with the latter, a fluid medium completely filling said housing and its interior chambers, and means within said housing operative from outside the latter for determinedly rotating said sleeve, comprising a housing-encased sleeve-actuating gear having a stem projected through said housing wall, and a brake-actuated lever connected to said projected stem.

4. A fluid brake mechanism for motors comprising a power shaft, a brake housing enclosing a portion of said shaft and extending at right angles therefrom, a central piston chamber open at one end within said housing, an annular chamber within said housing surrounding said piston chamber and in free communication with the open end of the latter, ports at the closed end of said piston chamber communicating with said annular chamber, a rotatable sleeve covering said ports and having apertures adapted to register with the latter, a fluid medium completely filling said housing and its interior chambers, excessive pressure relief by-passes having tensioned valves controlling flow of fluid into and out of said piston chamber, and means within said housing operative from outside the latter for determinedly rotating said sleeve comprising a housing-enclosed sleeve-actuating gear having a stem projected through said housing wall, and a brake-actuated lever connected to said projected stem.

5. A fluid brake mechanism for motors comprising a power shaft, a brake housing enclosing a portion of said shaft and extending at right angles therefrom and having a fluid-filled central piston chamber and annular surrounding chamber freely communicating at the shaft end of said housing, regulating ports controlling communication between said chambers at their opposite ends, a shaft reciprocated piston movable in said central chamber, a plurality of by-passes connecting said chambers, and tensioned valves for the latter automatically opened at a determined pressure to permit flow of liquid into and out of the piston chamber under the compressing action of the moving piston.

6. A fluid brake mechanism for motors comprising a power shaft, a brake housing enclosing a portion of said shaft and extending at right angles therefrom and having a fluid-filled central piston chamber and annular surrounding chamber freely communicating at the shaft end of said housing, regulating ports controlling communication between said chambers at their opposite ends, a shaft reciprocated piston movable in said central chamber, a by-pass from said cylinder chamber to said annular chamber, a second by-pass from said annular chamber to said cylinder chamber, a valve for each by-pass having a spring to normally seat the same, and means to determinedly adjust said spring tension and to permit unseating of said valves at a fixed piston-actuated liquid compression.

7. A fluid brake mechanism for motors comprising a transmission gear housing having a cranked projecting power shaft, a fluid-tight cylindrical brake housing secured to said transmission housing with one end enclosing a portion of said shaft, a fluid-filled central piston chamber and an annular surrounding chamber freely communicating at the shaft end of said brake housing, ports connecting said chambers at their opposite ends, a rotatable gear sleeve covering said ports and having apertures adapted to register with the latter, a sleeve engaging gear in said annular chamber having a stem projecting through the end wall of said brake housing, a brake-connected lever secured to the outer end of said stem, a double-acting piston in said piston chamber, and a connecting rod between said piston and power-shaft crank.

8. A fluid brake mechanism for motors comprising a transmission gear housing having a cranked projecting power shaft, a fluid-tight cylindrical brake housing secured to said transmission housing with one end enclosing a portion of said shaft, a fluid-filled central piston chamber and an annular surrounding chamber freely communicating at the shaft end of said brake housing, ports connecting said chambers at their opposite ends, a rotatable gear sleeve covering said ports and having apertures adapted to register with the latter, a sleeve engaging gear in said annular chamber having a stem projecting through the end wall of said brake housing, a brake-connected lever secured to the outer end of said stem, a double acting piston in said piston chamber, a connecting rod between said piston and power shaft crank, and spring-seated valve controlled by-passes connecting said chambers automatically opened at a determined piston-actuated liquid pressure.

9. A fluid brake mechanism for motors comprising a power shaft, a brake housing enclosing a portion of said shaft and extending at right angles therefrom, a central piston chamber open at one end within said housing, an annular chamber within said housing surrounding said piston chamber and in free communication with the open end of the latter, ports at the closed end of said piston chamber communicating with said annular chamber, a movable closure for said ports having apertures adapted to register with the latter, a fluid medium completely filling said housing and its interior chambers, and means within said housing operative from outside the latter for determinedly adjusting said movable closure.

In testimony whereof I affix my signature.

JOHN R. BINGAMAN.